United States Patent
Milovanovic et al.

(10) Patent No.: US 12,322,114 B2
(45) Date of Patent: *Jun. 3, 2025

(54) GRAPHICAL FIDUCIAL MARKER IDENTIFICATION

(71) Applicant: NVIDIA Corporation, Santa Clara, CA (US)

(72) Inventors: Vukasin Milovanovic, Santa Clara, CA (US); Joy D'Souza, San Jose, CA (US); Rochelle Pereira, San Mateo, CA (US); Jianyuan Min, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 331 days.

This patent is subject to a terminal disclaimer.

(21) Appl. No.: 17/393,615

(22) Filed: Aug. 4, 2021

(65) Prior Publication Data

US 2021/0366124 A1  Nov. 25, 2021

Related U.S. Application Data

(63) Continuation of application No. 16/248,135, filed on Jan. 15, 2019, now Pat. No. 11,113,819.

(51) Int. Cl.
  *G06T 7/13* (2017.01)
  *G06T 7/73* (2017.01)
  *G06T 19/00* (2011.01)

(52) U.S. Cl.
  CPC .......... *G06T 7/13* (2017.01); *G06T 7/73* (2017.01); *G06T 19/006* (2013.01); *G06T 2207/10024* (2013.01); *G06T 2207/30204* (2013.01)

(58) Field of Classification Search
  CPC ......... G01C 21/32; G01C 21/28; G06F 16/29; G06T 2207/30244; G06T 2207/30252;
  (Continued)

(56) References Cited

U.S. PATENT DOCUMENTS 7,406,196 B2 * 7/2008 Albertelli ............. G06V 30/147
  382/199
7,646,919 B2 * 1/2010 Olsson ................ G03F 7/70291
  382/199
(Continued)

FOREIGN PATENT DOCUMENTS

CN   106663207 A    5/2017
CN   108827316 A   11/2018
CN   108898148 A * 11/2018

OTHER PUBLICATIONS

Chen, J., et al., "An Optimized Union-Find Algorithm for Connected Components Labeling Using GPUs", arxiv.org, pp. 1-4 (2017).
(Continued)

*Primary Examiner* — Charles T Shedrick
(74) *Attorney, Agent, or Firm* — Taylor English Duma L.L.P.

(57) ABSTRACT

In various examples, image data may be received that represents an image. Corner detection may be used to identify pixels that may be candidate corner points. The image data may be converted from a higher dimensional color space to a converted image in a lower dimensional color space, and boundaries may be identified within the converted image. A set of the candidate corner points may be determined that are within a threshold distance to one of the boundaries, and the set of the candidate corner points may be analyzed to determine a subset of the candidate corner points representative of corners of polygons. Using the subset of the candidate corner points, one or more polygons may be identified, and a filter may be applied to the polygons to identify a polygon as corresponding to a fiducial marker boundary of a fiducial marker.

20 Claims, 8 Drawing Sheets

(58) Field of Classification Search
CPC .............. G06T 7/74; G06T 2207/10016; G06T 2207/30261; G06T 7/73; G01S 19/48
See application file for complete search history.

(56) References Cited

U.S. PATENT DOCUMENTS

| | | | |
|---|---|---|---|
| 11,423,633 B2* | 8/2022 | Pribble | G06V 10/20 |
| 2002/0136447 A1* | 9/2002 | Link | G06V 10/143 |
| | | | 382/163 |
| 2005/0207652 A1* | 9/2005 | Albertelli | G06V 30/424 |
| | | | 382/199 |
| 2006/0059494 A1* | 3/2006 | Wexler | G06F 9/505 |
| | | | 718/105 |
| 2008/0240613 A1* | 10/2008 | Dietz | G02B 21/367 |
| | | | 382/284 |
| 2009/0190831 A1 | 7/2009 | Van Der Putten | |
| 2013/0121595 A1* | 5/2013 | Kawatani | G06V 10/24 |
| | | | 382/199 |
| 2013/0259304 A1* | 10/2013 | Aller | B42D 15/00 |
| | | | 382/103 |
| 2015/0178593 A1* | 6/2015 | Shen | G06F 18/21 |
| | | | 382/190 |
| 2015/0235423 A1* | 8/2015 | Tobita | G06T 7/74 |
| | | | 345/633 |
| 2016/0094840 A1* | 3/2016 | Warner | G06T 7/80 |
| | | | 348/188 |
| 2017/0249745 A1* | 8/2017 | Fiala | G06T 7/13 |
| 2018/0149855 A1* | 5/2018 | Chou | G02B 27/0075 |
| 2018/0189587 A1* | 7/2018 | Mandal | G06V 10/94 |
| 2020/0098131 A1* | 3/2020 | Rivera | G06T 7/73 |
| 2020/0160599 A1* | 5/2020 | Núñez | G06T 7/536 |
| 2022/0245851 A1* | 8/2022 | Xu | G06T 7/70 |
| 2022/0292796 A1* | 9/2022 | Xu | G06T 7/73 |

OTHER PUBLICATIONS

Hartley, R., and Zisserman, A., "Multiple view geometry in Computer Vision", 2nd Edition, pp. 673 (2003).

Harris, C., and Stephens, M., "A Combined Corner and Edge Detector", 4th Alvey Vision Conference, pp. 147-152 (1988).

Olson, E., "AprilTag: a robust and flexible visual fiducial system", In Robotics and Automation, IEEE International Conference, pp. 1-8 (2011).

Ruzon, M. A., and Tomasi, C., "Edge, junction, and corner detection using color distributions", IEEE Transactions on Pattern Analysis and Machine Intelligence, vol. 23, No. 11, pp. 1281-1295 (Nov. 2001).

Wang, J., and Olson, E., "AprilTag 2: Efficient and robust fiducial detection", IROS, pp. 1-6 (2016).

Wang, Y., et al., "The Harris corner detection method based on three scale invariance spaces", International Journal of Computer Science Issues, vol. 9, Issue 6, No. 2, pp. 18-22, (Nov. 2012).

Milovanovic, Vukasin; First Office Action for Chinese Patent Application No. 202010018122.9, filed Jan. 8, 2020, mailed Jun. 1, 2024, 16 pgs.

* cited by examiner

GRAPHICAL FIDUCIAL MARKER IDENTIFICATION

RELATED APPLICATIONS

This application is a continuation of U.S. patent application Ser. No. 16/248,135, titled "GRAPHICAL FIDUCIAL MARKER IDENTIFICATION," filed Jan. 15, 2019, which is incorporated herein by reference in its entirety.

BACKGROUND

Fiducial markers, such as AprilTags, ARTags, ARToolkit, ARToolkitPlus, RUNE-Tags, reacTIVision, QR codes, and the like, have been used in virtual reality, augmented reality, robotics, and other technology areas for localization of objects (e.g., robot-to-robot localization), identification of objects, detecting positions of objects, detecting orientations of objects, testing of virtual reality headsets, tracking objects in an environment, Simultaneous Localization and Mapping (SLAM) algorithm evaluation, camera calibration, and other uses. Typically, fiducial markers are deployed as patterns of graphical data in a pre-determined arrangement within a polygon, each pattern being uniquely mapped to a corresponding data record (user account, unit, product, message, etc.). In order to use fiducial markers for these purposes, specialized algorithms are used to detect and identify the fiducial markers in a scene or environment.

Some conventional approaches to detecting fiducial markers have relied on graph-based image segmentation algorithms to identify lines within an input image and combine them into polygons. These approaches resulted in an overwhelming number of identified polygons (e.g., quadrilaterals), thereby creating a drain on computing resources when filtering the polygons to identify actual fiducial markers in the image. Further, some conventional approaches use segmentation to identify boundaries in an image, and then analyze each of the pixels along the boundaries to determine corners of polygons. However, analyzing each of the pixels along the boundaries is inefficient, and results in significant computing, time, and energy costs.

As described above, each of these conventional methods results in a significant drain on computing and energy resources. This is exacerbated by their reliance on central processing units (CPUs) to identify fiducial markers. For example, due to the processing limitations of CPUs, these conventional approaches may be capable of operating at a frame rate of thirty frames per second (fps) with input images having a resolution of 640×480 (e.g., 480p), but may only be capable of operating at a frame rate of ten fps for input images with a resolution of 1920×1080 (e.g., 1080p), for example. Such low frame rates may not support the functionality required for many uses of fiducial markers, especially as the resolution of input images continues to increase (e.g., to 3840×2160 (e.g., 4k), 7680×4320 (e.g., 8k), or greater).

SUMMARY

Embodiments of the present disclosure relate to graphical fiducial marker identification. More specifically, systems and methods are disclosed that use computer vision processing, implemented at least partly on a graphics processing unit (GPU) in some examples, to identify fiducial markers using image data that is representative of environments that include fiducial markers.

In contrast to conventional systems, such as those described above, present systems may implement filtering and segmentation for input images to identify boundaries within the input images. By identifying boundaries in this way, the drawbacks of conventional approaches related to identifying a large number of quadrilaterals or other polygons in the input image are significantly reduced. In addition, and in some examples in parallel with the image thresholding and segmentation processes, the present systems may implement corner detection for identifying pixels that correspond to corners of objects in the input image. The identified corners are then filtered such that only corners within a threshold distance to one of the boundaries within the input image remain. By identifying and filtering the corners in this way, only a small number of pixels may be required for detecting and processing polygons in the input image, thereby drastically reducing the computing cost for identification of fiducial markers.

In addition, in further contrast to conventional systems, the present systems may implement at least some of the processes on a GPU(s). In doing so, the efficiency of performing the processes is increased, especially when two or more processes are executed in parallel (e.g., image thresholding, image segmentation, and/or corner detection). Further, due to the offloading of some of the processing to a GPU(s), only a small amount of processing may be required of a central processing unit(s) (CPU), thus increasing the overall efficiency and effectiveness of the system, while also reducing computing and energy requirements. For example, the processes described herein may enable the system to perform effectively at higher image resolutions (e.g., 1080p, 4k, etc.), such as by effectively identifying fiducial markers within input images at a frame rate of thirty frames per second (fps) or greater.

BRIEF DESCRIPTION OF THE DRAWINGS

The present systems and methods for graphical fiducial marker identification is described in detail below with reference to the attached drawing figures, wherein.

DETAILED DESCRIPTION

Figure 1A:
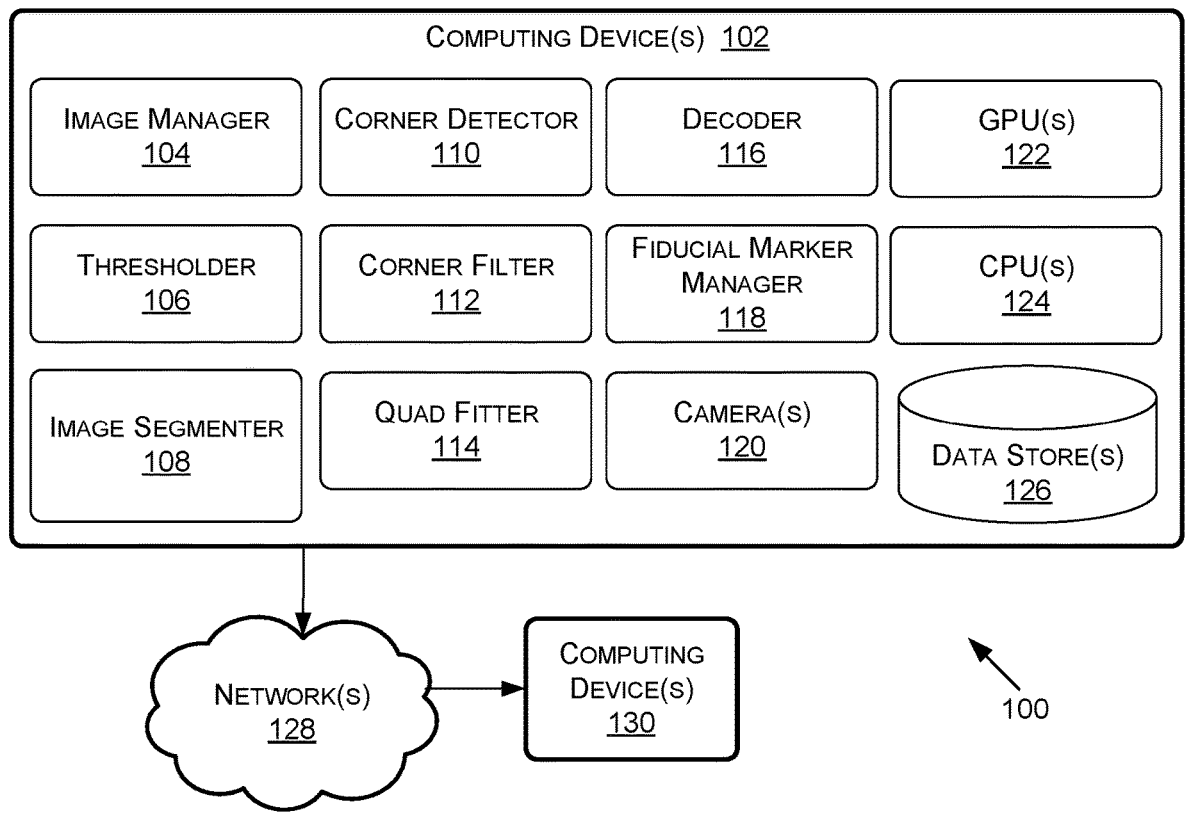
FIG. 1A is a system diagram of a fiducial marker identification system, in accordance with some embodiments of the present disclosure.

Systems and methods are disclosed related to fiducial marker identification using graphics processing units. With reference to FIG. 1A, FIG. 1A is an example system diagram of a fiducial marker identification system 100, in accordance with some embodiments of the present disclosure. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The fiducial marker identification system 100 may include, among other things, computing device(s) 102, computing device(s) 130, and/or network(s) 128. Although the computing device(s) 102 and the computing device(s) 130 are illustrated in FIG. 1, this is not intended to be limiting. In any embodiment, there may be any number of computing devices 102 and/or computing device(s) 130. The fiducial marker identification system 100 (and the components and/or features thereof) may be implemented using one or more computing devices, such as the computing device 600 of FIG. 6, described in more detail herein.

Components of the fiducial marker identification system 100 may communicate over network(s) 128. The network(s) may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the fiducial marker identification system 100 may communicate with one or more of the other components via one or more of the network(s) 128.

The computing device(s) 102 (and/or the computing device(s) 130) may include a smart phone, a laptop computer, a tablet computer, a desktop computer, a wearable device, a game console, a virtual reality system (e.g., a headset, a computer, a vehicle, a game console, remote(s), controller(s), and/or other components), an augmented-reality system, a smart-home device that may include an intelligent personal assistant, a robotics device, a smart or IoT camera, and/or any other type of device capable of fiducial marker identification (e.g., capable of analyzing an input image to identify one or more fiducial markers within the input image).

The computing device(s) 102 may include an image manager 104, a thresholder 106, an image segmenter 108, a corner detector 110, a corner filter 112, a quad fitter 114, a decoder 116, a fiducial marker manager 118, a camera(s) 120, a graphics processing unit(s) (GPU) 122, a central processing unit(s) (CPU) 124, a data store(s) 126, and/or additional or alternative components. In some examples, one or more of the components or features may be implemented by a first computing device 102, and one or more other of the component or features may be implemented by a second computing device 102 and/or 130. For example, at least some of process 132 may be implemented by a first computing device 102 and at least some of the process 132 may be implemented by a second computing device 102 and/or 130. In other examples, each of the process blocks of the process 132 may be implemented by a single computing device.

In one non-limiting example, a first computing device 102 may capture image(s) using a camera(s) 120, and another computing device(s) 102 and/or 130 may process the image(s) according to the process 132. In yet another non-limiting example, the same computing device 102 may capture the image(s) using the camera(s) 120 and may process the image(s) according to the process 132. For example, a first computing device 102 may be in a robot, and a second computing device 102 and/or 130 may be a server(s) and/or in another robot(s), such that the robot may capture image(s) and/or perform some processing, while other processing is offloaded to the server(s) and/or the other robot. In some examples, the computing device(s) 102 may be a virtual reality system, and the system may include a headset, a computer, and/or be in communication with one or more server(s) over the network(s) 128. As a result, the process 132 may be executed by the headset, the computer, and/or the server(s). Other examples are contemplated without departing form the scope of the present disclosure. In other words, any combination of computing device(s) 102 and/or 130 may be used to implement the fiducial marker identification system and to execute the process 132 and/or other processes for fiducial marker identification.

Figure 1B:
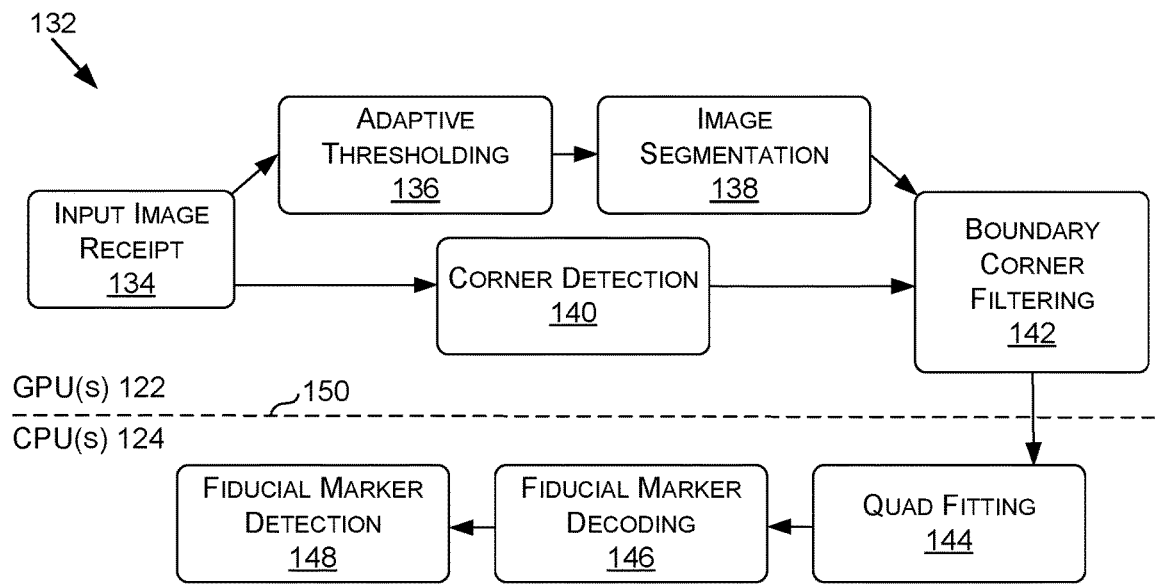
FIG. 1B is an example data flow diagram illustrating a process that may be implemented by the fiducial marker identification system of FIG. 1A, in accordance with some embodiments of the present disclosure.

The fiducial marker identification system 100 may be used to execute fiducial marker identification according to any of a number of different methods and/or processes. In other words, although the components and functionality of the system 100 may be described herein with respect to the data flow diagram of FIG. 1B, illustrating a process 132 for fiducial marker identification, this is not intended to be limiting. For example, although adaptive thresholding 136 and image segmentation 138 are illustrated as being executed in parallel with corner detection 140, this is not intended to be limiting. In some examples, additional or alternative process blocks may be executed in parallel, or none of the process blocks of the process 132 may be executed in parallel. As another example, additional or alternative process blocks may be implemented by the fiducial marker identification system 100 other than those illustrated in FIG. 1B.

Now referring to FIG. 1B, FIG. 1B is an example data flow diagram illustrating the process 132 that may be implemented by the fiducial marker identification system 100 of FIG. 1A, in accordance with some embodiments of the present disclosure. The process 132 may be, without limitation, implemented on a GPU(s) 122 and a CPU(s) 124 of the computing device(s) 102. For example, the process blocks of the process 132 that are more computationally expensive may be implemented on the GPU(s) 122 to increase efficiency. In addition, by implementing at least some of the process blocks on the GPU(s) 122, two or more of the process blocks may be implemented in parallel (e.g., parallel processing using NVIDIA's CUDA). For example, because the GPU(s) 122 may be capable of executing a large number of threads simultaneously, and because the GPU(s) 122 may be better suited for processing image data than the CPU(s) 124, by implementing at least some of the process blocks on the GPU(s) 122, the computation time for identifying fiducial markers in images may be drastically reduced as compared to conventional approaches, such as those described herein. In addition, as described herein, the process 132 itself includes process blocks that, even if implemented on the CPU(s) 124, would reduce computation time as compared to conventional approaches. As a result, by creating a more efficient process 132, and implementing the process 132 at least in part on the GPU(s) 122, the overall processing requirements, computing power, energy, and bandwidth resources required in identifying fiducial markers in images may be significantly reduced.

In some examples, and without limitation, the process blocks of the process 132 illustrated above dashed line 150 in FIG. 1B may be executed at least in part on the GPU(s) 122 of the computing device(s) 102, while the process blocks illustrated below the dashed line 150 may be executed at least in part on the CPU(s) 124 of the computing device(s) 102.

The process 132 may include input image receipt 134. For example, image data representative of an input image(s) 202 (FIG. 2A) may be received (e.g., in response to the input image(s) 202 being captured by the camera(s) 120) by and/or managed by the image manager 104. For example, the input image(s) 202 may be stored in the data store(s) 126 by the image manager 104 upon the input image receipt 134, and/or may be obtained from the data store(s) 126 by the image manager 104 to pass the input image 202 to another process block (e.g., adaptive thresholding 136, corner detection 140, etc.).

In some examples, the input image 202 may be of a higher dimensional color space than a converted image generated as a result of adaptive thresholding 136 (described in more detail herein). For example, the input image 202 may be a color image, such as a red, green, and blue (RGB) color image, a cyan, magenta, yellow, and black (CMYK) color image, an indexed color image, a hue, saturation, and brightness (HSB) color image, and/or another image type.

Figure 2A:
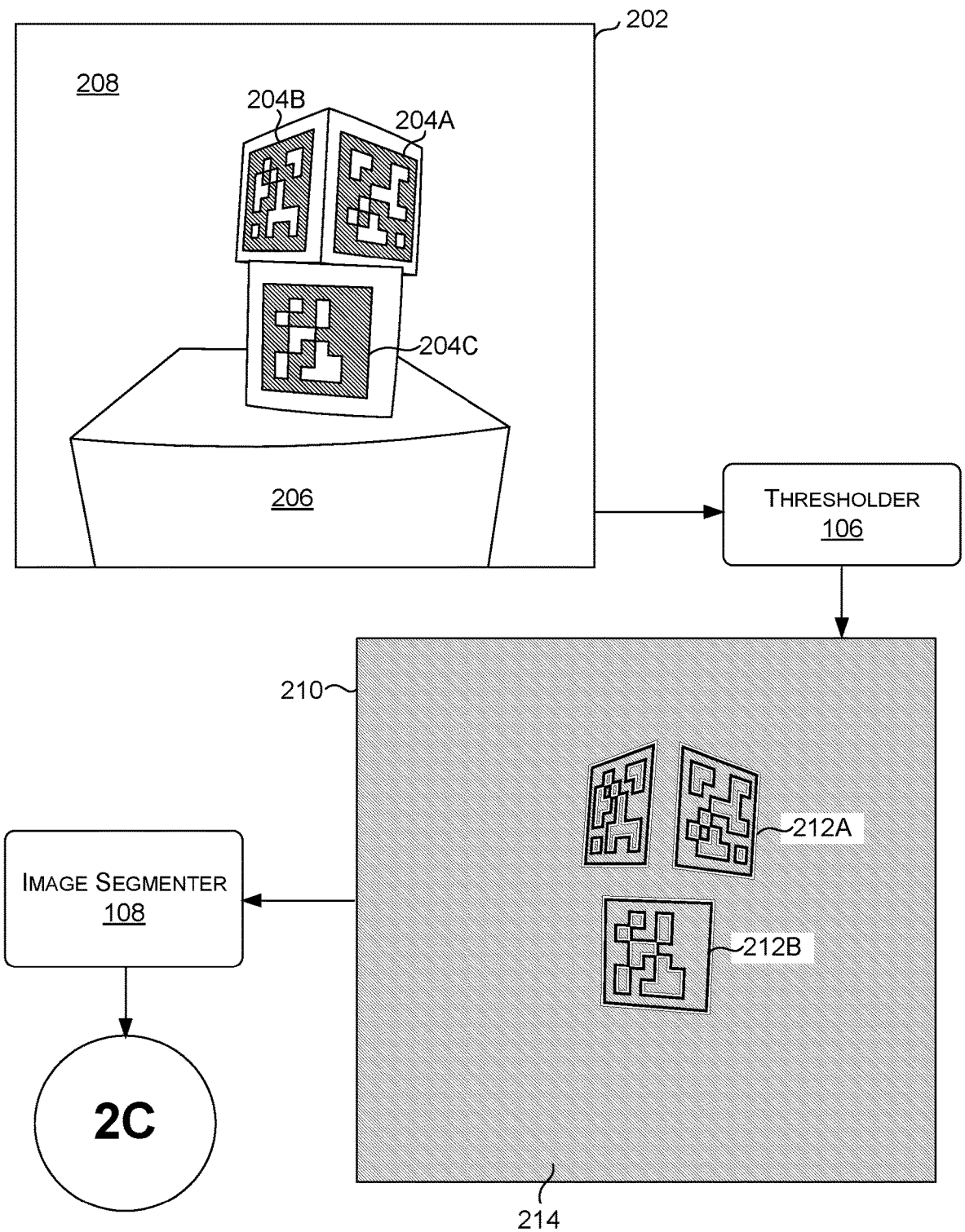
FIG. 2A is an example data flow diagram for fiducial marker identification, in accordance with some embodiments of the present disclosure.

As illustrated in FIG. 2A, the input image 202 may include any number of fiducial markers 204 (e.g., fiducial marker 204A, fiducial marker 204B, fiducial marker 204C, etc.). Although the fiducial markers 204 described with respect to FIGS. 2A-2C and FIG. 3 include AprilTags, this is not intended to be limiting. For example, similar processes and/or process blocks of the process 132 may be executed using ARKit fiducial markers, ARToolkit, ARToolKitPlus, and/or other fiducial marker types, without departing from the scope of the present disclosure.

The input image(s) 202 may further include additional objects, such as a table 206, and/or one or more other objects (not illustrated) in a background 208 of the input image 202, for example.

The image manager 104 may transmit, send, and/or pass the input image 202 to the thresholder 106 for adaptive thresholding 136 of the input image 202 and/or may transmit, send, and/or pass the input image 202 to the corner detector 110 for corner detection 140. The thresholder 106 may receive the input image 202 and execute, as an example and without limitation, adaptive thresholding 136 on the input image 202. However, in other examples, other types of thresholding may be executed by the thresholder 106. For example, global thresholding, local thresholding, adaptive thresholding, and/or a combination thereof may be executed by the thresholder in addition to or alternative to adaptive thresholding.

When implementing adaptive thresholding 136, the thresholder 106 may convert the input image 202 into a grayscale version of the input image 202 (e.g., a grayscale input image). Once the grayscale input image is generated, adaptive thresholding 136 may be executed in order to find minimum and maximum values in a region around each pixel of the grayscale input image. However, in some examples, instead of computing exact extrema (e.g., maximum and minimum values) around each pixel of the grayscale input image, the grayscale input image may be divided into tiles of pixels (e.g., 4×4 pixels, in some examples). The extrema (e.g., maximum and minimum) within each of the tiles may then computed. To prevent artifacts from arising between tile boundaries that have large differences in extrema values, the extrema in a group of surrounding tiles (e.g., a 3×3 neighborhood of tiles, in some examples) may be used when computing extrema for adjacent pixels in the input grayscale image (e.g., to ensure that at least one tile overlap is factored into the calculating of the extrema). As a result, each pixel may take the maximum and minimum from the surrounding tiles as its maximum and minimum. If the maximum and minimum values are too close in a given tile, the tile may be identified as not having a high enough contrast, and pixels within the tile may be assigned a pixel value associated with gray (or another color(s)) and omitted from further processing. When a tile has sufficient contrast, each pixel may be assigned a value of white or black using the mean value as the threshold (e.g., (maximum+minimum)/2).

The result of the adaptive thresholding 136 may include a converted image 210 (alternatively referred to herein as a thresholding image 210). In some examples, the converted image 210 may be a binary image and/or referred to as a binary image (e.g., because the only pixels used in further processing may be the black pixels and the white pixels). As such, the converted image 210 may be of a lower dimensional color space than the input image 202, as described herein. As illustrated in the converted image 210, and as a result of the adaptive thresholding 136, regions 212 (e.g., white regions 212A and black regions 212B) of black pixels adjacent white pixels and white pixels adjacent black pixels may remain black and white after adaptive thresholding 136, while other portions 214 of the converted image 210 (e.g., the pixels therein) may be gray (e.g., as illustrated by the closely spaced diagonal lines). For example, regions where a tile of black pixels is surrounded by tiles of black pixels may not have high enough contrast, and thus may be converted to gray. In some examples, any of the pixels assigned with a pixel value representative of gray (or another color indicative of an unimportant pixel for identification of fiducial markers) may be excluded from any future processing blocks of the process 132 (e.g., the image segmenter 108, when executing image segmentation 138, may exclude these pixels from processing).

When identifying fiducial markers, such as AprilTags, ARTags, and/or the like, the pixel colors associated with the fiducial markers in the image(s) are only black or white (e.g., because the fiducial markers are black and white) and, as a result, this process of adaptive thresholding 136 may allow for consistent differentiation of the white pixels and the black pixels that form the fiducial marker, while ignoring the remaining pixels that are changed to another color (e.g., gray).

The thresholder 106 may transmit, send, and/or pass the converted image 210 to the image segmenter 108. The image segmenter 108 may execute image segmentation 138 to group the continuous white regions 212A and black regions 212B of the converted image 210 and extract boundaries segmenting these regions 212.

Conventional approaches have identified pixels that have an opposite colored neighbor pixel (e.g., a white pixel adjacent a black pixel), and then formed connected groups of these identified pixels (e.g., continuous groupings of white pixels that are each adjacent a black pixel) as edges. However, these conventional approaches may not be effective when the white pixel groupings are only a single pixel wide (e.g., as result of a faraway tag, or a physically small tag). In such approaches, black pixel groupings adjacent the single pixel wide white pixel groupings may be identified as a single edge incorrectly, and thus result in the fiducial marker going undetected.

In order to overcome these drawbacks of conventional approaches, the image segmenter 108 may use union-find-based region clustering and region boundary extraction. The union-find-based region clustering may include segmenting or grouping the converted image 210 into continuous regions of black and continuous regions of white (e.g., the white regions 212A and the black regions 212B). In order to segment the converted image 210 in this way, neighboring white pixels from the converted image 210 may be grouped together and neighboring black pixels from the converted image 210 may be grouped together. This process may include local merging, boundary processing, and global union merge. Each of the processes may be implemented on a separate kernel using the GPU(s) 122 (e.g., local merging on a first CUDA kernel, boundary processing on a second CUDA kernel, and global union merge on a third CUDA kernel).

For the local merging processing of the union find based region clustering, the converted image 210 may be divided into blocks of pixels (e.g., 4×4 pixels, 8×8 pixels, etc.). In some examples, each of the blocks may be assigned to a different thread on the GPU(s) 122, and the different threads may be capable of cooperating with one another using shared memory, and/or may be capable of synchronization with one another. A row scan and a column scan may be executed on each block of pixels in order to link every pixel to its left neighbor pixel and its upper neighbor pixel. In some examples, the link may only be made when the neighbor pixels have the same intensity (e.g., black or white). After local merging, there may not be links across blocks of pixels, only between pixels within the same blocks.

For the boundary processing of the union find based region clustering, cells (or pixels) along the boundaries of the blocks of pixels may be linked to the cells (or pixels) along the boundaries of neighboring blocks of pixels. For example, another row scan and column scan may be executed on the boundary of each block of pixels with respect to an adjacent boundary of an adjacent block of pixels. After the local merging processing and the boundary processing, each pixel in the converted image 210 may have a link to neighboring pixels of the same intensity (e.g., white or black).

For the global union merge processing of the union-find-based region clustering, each of the pixels in a continuous black region or a continuous white region may be linked to a same representative parent pixel. Each continuous black region and each continuous white region may then be assigned a unique region identifier (ID).

For the region boundary extraction, the boundaries between the continuous black regions and the continuous white regions may be extracted. The region boundary extraction may be executed on the GPU(s) 122, and more specifically may be executed using a processing kernel (e.g., a CUDA kernel). For example, the boundaries may be represented as a set of unordered points labeled by region IDs. The boundaries may be stored in a two-dimensional boundary grid where cell position within the block of pixels may encode the boundary coordinates and the cell values may indicate the region IDs. Boundary points between each black pixel and a neighboring or adjacent white pixel may then be identified. For example, each black pixel at image coordinate "P1" with region ID "ID1" and its neighboring white pixel at image coordinate "P2" with region ID "ID2" may be identified. The boundary points may then be indexed by image coordinates (e.g., (P1+P2)/2) and assigned boundary identifier (ID) values based on the IDs of the neighboring region(s) (e.g. two 32-bit region IDs may be combined by shifting one of them by 32 bits and adding the other ID to get a unique 64-bit boundary ID).

For example, with respect to the converted image 210, the boundary between the white region 212A and the black region adjacent or neighboring the white region 212A may be identified as a boundary using the region boundary extraction process. Similarly, for each of the black regions extending adjacent the white regions, other boundaries may be identified and each of the boundaries may be assigned a boundary ID, where the boundary ID indicates a single continuous boundary.

As a result, in contrast to the conventional systems as described above, as a result of image segmentation 138, a single pixel wide white region adjacent a first black region and a second black region (e.g., on either side of the white region) would result in identification of two different boundaries (e.g., a first boundary between the first black region and the white region and a second boundary between the second black region and the white region).

The image segmenter 108 may transmit, send, and/or pass the boundary information to the corner filter 112. In addition, as described in more detail below, the corner filter 112 may also receive outputs from the corner detector 110 after corner detection 140. Because the adaptive thresholding 136 and image segmentation 138 process blocks may not be required to execute corner detection 140, these processes may be executed in parallel in some examples (e.g., using parallel processing capabilities of the GPU(s) 122), prior to hand off to the corner filter 112 for boundary corner filtering 142.

Conventional systems, as described herein, may analyze each of, or a large number of, the pixels along the boundaries identified in the image to determine corners of polygons. However, analyzing each of the pixels along the boundaries is inefficient, and results in significant computing and energy costs. In contrast to conventional systems, by using corner detection 140 in the subject technology, only a relatively small number of points are identified as candidate corners—a majority of which are representative of actual corners 218, such as the corners 218A and 218B). While a small number of points may be temporarily misidentified as candidate corners 218 (such as candidate corners 220A and 218D, the processing, computing, and energy requirements are reduced as less overall pixels (e.g., the pixels representative of candidate corners 218) are processed. In addition, in contrast to conventional systems, because the boundaries in the input image are not required to have been identified prior to corner detection 140, corner detection 140 may be executed in parallel with adaptive thresholding 136 and/or image segmentation 138 (e.g., the process steps for identifying the boundaries), thereby reducing processing time and increasing the efficiency of the system 100.

Figure 2B:
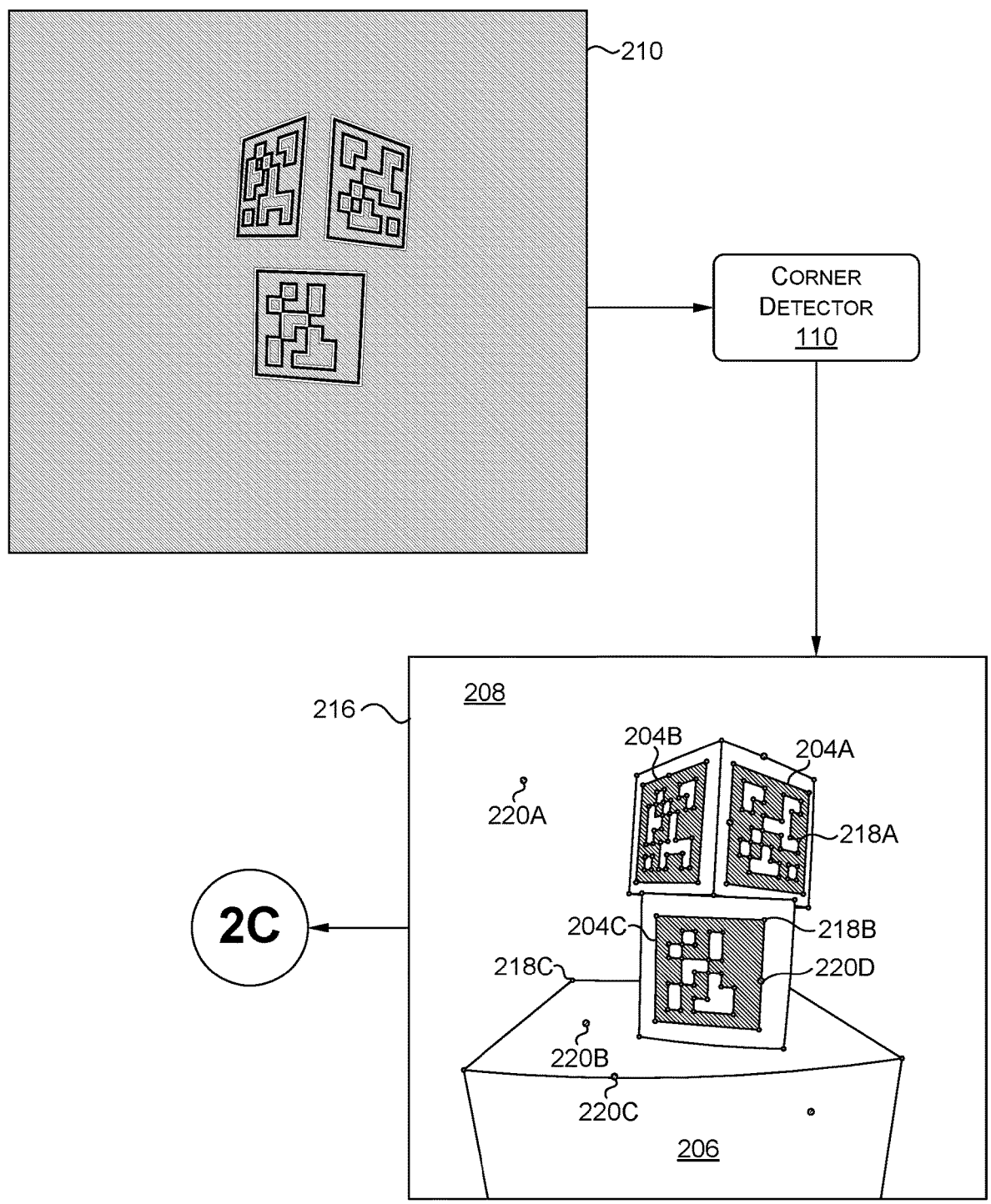
FIG. 2B is another example data flow diagram for fiducial marker identification, in accordance with some embodiments of the present disclosure.

The corner detector 110 may execute corner detection 140 on a grayscale version of the input image 202 (e.g., the grayscale input image), the input image 202, and/or the converted image 210 (as illustrated in FIG. 2B), to detect candidate corners 218 (e.g., illustrated with no shading or other fill in FIG. 2B) in the grayscale input image, the input image 202 and/or the converted image 210. The visualization 216, illustrating an example result of corner detection 140 as represented on the input image 202, may include the fiducial markers 204, the table 206, the background, and a plurality of candidate corners 218. The candidate corners 218 (e.g., the corners 218A-218C, and the unlabeled corners 218) are not intended to be limiting, as additional or alternative candidate corners 218 may have been identified as a result of corner detection 140 without departing from the scope of the present disclosure. In some examples, corner detection 140 may be implemented on the GPU(s) 122, as described herein.

In some examples, corner detection 140 may result in some pixels being labeled as candidate corners even when the pixels are not representative of actual corners (e.g., misidentified pixels 220, illustrated with shading in FIG. 2B). For example, corner detection 140 may be sensitive to shadows, noise, and/or image resolution concerns and, as a result, some of the pixels (e.g., the misidentified pixels 220A-220D) may be identified as candidate corners 218 even though they are not actual corner points. However, even with the misidentified pixels 220, the result of using corner detection 140 still identifies less pixels (e.g., the corners 218) that need to be analyzed than conventional approaches. In any example, the corners 218 and the misidentified pixels 220 may be referred to collectively as a set of candidate corner points, or a set of identified candidate corner points.

In some examples, to account for the issues with shadows, noise, and/or image resolution concerns, additional processing may be executed. For example, in examples where corner detection 140 may be scale variant (e.g., only the grayscale input image and/or the converted image 210 is used, at a single scale), additional processing may be performed to cover different scale spaces in the image, such as by using a variable Gaussian convolution kernel. For example, in addition to the grayscale input image and/or the converted image 210, at least one additional scale space image may be generated. In some non-limiting examples, three additional scale space images may be generated and, in addition to or alternatively to the grayscale input image and/or the converted image 210, the three additional scale space images may also be analyzed to determine candidate corners. In some examples, each of the scale space images may be executed using a different kernel specific to the scale space of the image. In any example, the corners detected in the different scale space image(s) as well as the grayscale input image and/or the converted image 210 may be compared to determine relationships between the detected candidate corners. For example, the candidate corners detected in each scale space image may be compared against the grayscale input image and/or the converted image 210 to determine whether the corners are supported (e.g., identified) in each image. As a result, at least some of the misidentified pixels (e.g., detected as candidate corners in one image, but not in another image of a different scale space) detected as a result of noise, shadows, and/or image resolution concerns may be filtered out, thereby resulting in an even smaller number of pixels to be analyzed as corners 218.

Figure 2C:
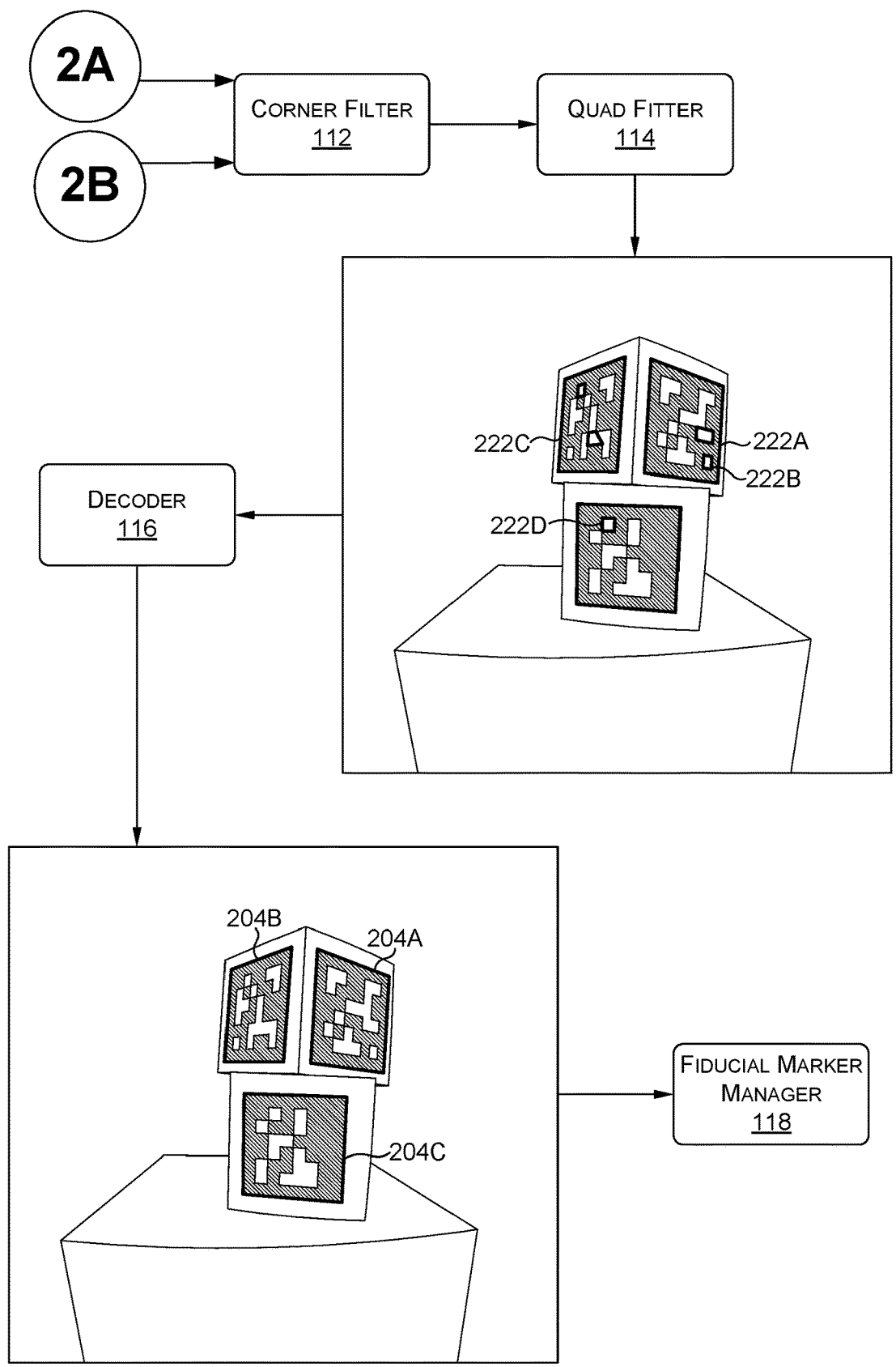
FIG. 2C is another example data flow diagram for fiducial marker identification, in accordance with some embodiments of the present disclosure.

As described above, the detected candidate corners 218 (which may include the misidentified pixels 220) may then be transmitted, sent, and/or passed to the corner filter 112 for boundary corner filtering 142 (as illustrated in FIG. 2C). The corner filter 112 may also receive the boundaries 308 (e.g., the boundaries between the white pixel regions 212A and the black pixel regions 212B) from image segmentation 138, as described above. As a result, the corner filter 112 may use the corners 218, the misidentified pixels 220, and the boundaries 308 to execute boundary corner filtering 142. As described herein, because corner detection 140 may result in the misidentified pixels 220, such as misidentified pixels 220A and 220B that are not on a boundary 308, boundary corner filtering 142 may be used to filter out at least some of the misidentified pixels 220.

Figure 3:
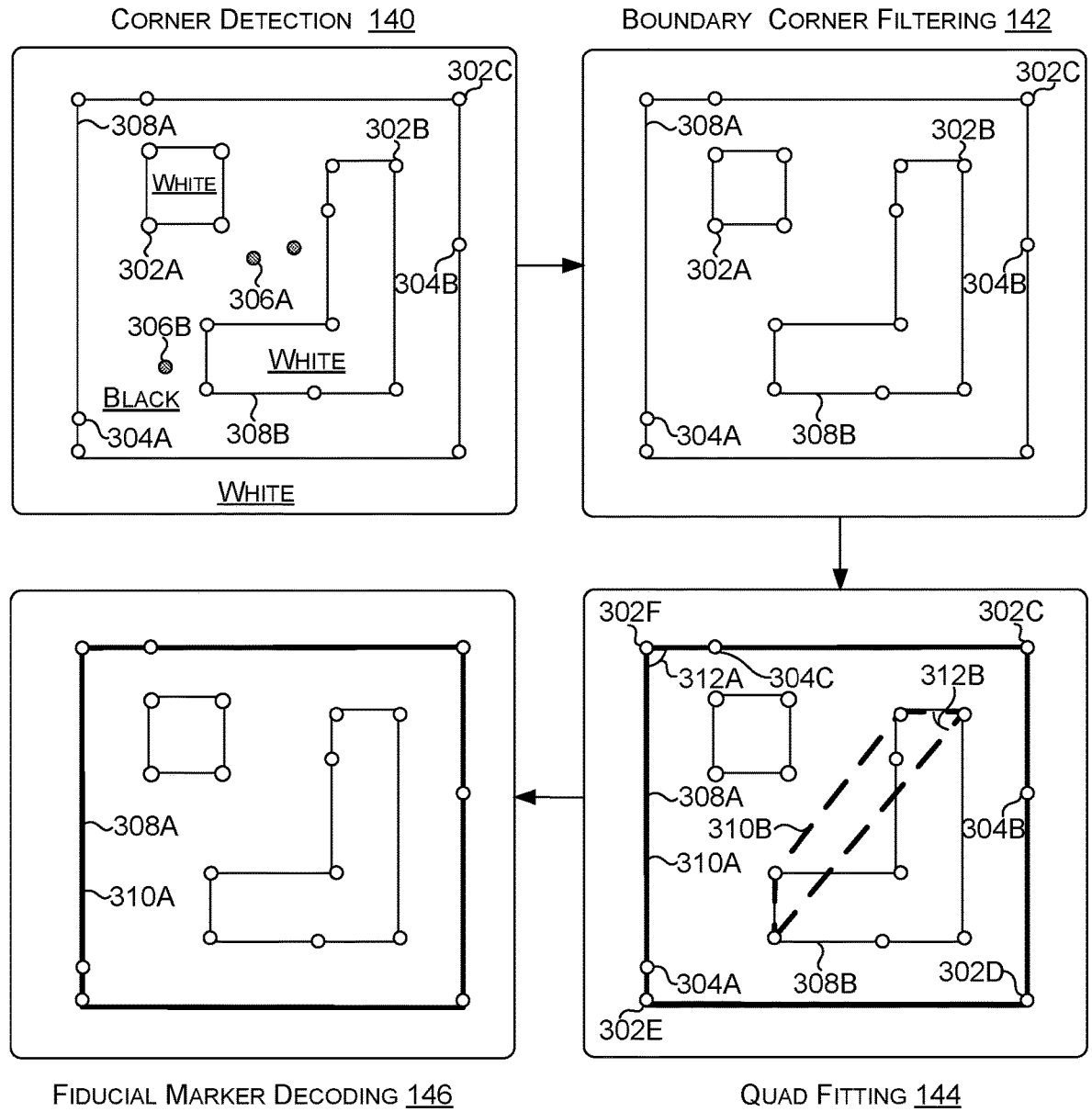
FIG. 3 is an example illustration of a portion of a fiducial marker identification method, in accordance with some embodiments of the present disclosure.

As illustrated in FIG. 3, first pixels 302 may have been identified by the corner detector 110 that are corners 218, second pixels 304 may have been identified that are on or near boundaries 208 but are misidentified pixels 220, and third pixels 306 (illustrated with shading in FIG. 3) may have been identified that are not corners 218, not located on or near boundaries 208 (e.g., a threshold distance away from a boundary 308, such as two pixels, four pixels, etc. away from a boundary 308), and are misidentified pixels 220. Boundary corner filtering 142 may then be used to filter out the third pixels 306 that are misidentified pixels 220 and are not within a threshold distance to a boundary 308. In some examples, the threshold distance may be a number of pixels away from a boundary 308 (e.g., a pixel associated with a boundary 308). For example, and without limitation, the threshold distance may be two pixels, three pixels, seven pixels, ten pixels, or the like. As a result, the pixels in the image may be filtered out if they are not included in the corner candidates (e.g., are not included in the corners 218 and/or the misidentified pixels 220) and are not within the threshold distance to one of the boundaries 308. The resulting pixels (e.g., the first pixels 302 and the second pixels 304) may be referred to collectively as a subset of the set of the candidate corners (e.g., the set of the pixels may include the corners 218 and the misidentified pixels 220).

Boundary corner filtering 142 may be executed by the GPU(s) 122, as described herein, and a kernel (e.g., a CUDA kernel) may be used to analyze each of the pixels (e.g., the first pixels 302, the second pixels 304, and the third pixels 306) identified as corners 218 and/or misidentified pixels 220 in parallel (e.g., each pixel may be applied to a separate thread on the GPU(s) 122).

The corner filter 112 may then transmit, send, and/or pass the pixels (e.g., the first pixels 302 and the second pixels 304) to the quad fitter 114 to execute quad fitting 144. In some examples, quad fitting 144 may be executed by the CPU(s) 124 and, as a result, the pixels may be copied from memory associated with the GPU(s) 122 to memory associated with the CPU(s) 124. For example, the pixels (e.g., a location of the pixels in the image) may be retrieved from the memory of the GPU(s) 122 and transmitted to and stored by the memory of the CPU(s) 124. In some examples, the data store(s) 126 may be inclusive of the memory associated with the GPU(s) 122 and/or the memory associated with the CPU(s) 124. In contrast to conventional systems, where a large number of edge pixels (e.g., each of the pixels along boundaries identified in images) were analyzed by a CPU(s), the system 100 may only require that the CPU(s) 124 analyze the subset of the set of the pixels (e.g., the first pixels 302 and the second pixels 304) to determine whether the pixels are representative of corners of polygons (e.g., quadrilaterals, such as the quadrilaterals that form fiducial marker boundaries for AprilTags, ARTags, and/or the like). As a result, significant computational and processing time may be saved, thereby resulting in a more efficient and robust system 100 that may be capable of handling higher image resolutions (e.g., 1080p, 4k, etc.) than conventional systems at the same or higher frame rate (e.g., 30 fps, 60 fps, etc.) while still accurately identifying fiducial markers.

The quad fitter 114 may execute quad fitting 144 in order to identify corners 218 of polygons. As such, although the quad fitter 114 is referred to with reference to a quad, or quadrilateral, this is not intended to be limiting. For example, the quad fitter 114 may alternatively be referred to as a polygon fitter 114, and quad fitting 144 may alternatively be referred to as polygon fitting 144 (e.g., when the fiducial marker boundary is not a quadrilateral).

Each of the corners 218 and the misidentified pixels 220 may be stored in a hash table. Within the hash table, each corner 218 (e.g., the first pixels 302) and each misidentified pixel 220 (e.g., the misidentified pixels 220 associated with a boundary 308, such as the second pixels 304) may be stored with a corresponding boundary ID (e.g., based on the boundary 308 that the pixel is associated with, as determined by image segmentation 138) for a respective boundary 308 (e.g., a boundary determined during image segmentation 138 that extends between adjacent or neighboring white pixel regions 212A and black pixel regions 212B). As a result, each the corners 218 and/or the misidentified pixels 220 associated with the same boundary ID may be grouped together. Then, the quad fitter 114 may analyze each group separately from each other group in order to identify the best corner candidates (e.g., the best corners 218 and/or misidentified pixels 220) for representing a fiducial marker boundary of a fiducial marker 204.

In some examples, the groups of pixels may first be analyzed based on a number of pixels associated with each boundary. For example, for fiducial markers that have boundaries of a known shape, the number of corner points may also be known (e.g., square or rectangle have four corners, triangle has three, etc.). As such, once the groups of pixels are formed for each boundary, the groups of pixels may be analyzed in view of the number of pixels that should be present for the fiducial marker type. For example, if the fiducial marker boundary is known to be a square and thus have four corner points, any of the groups of pixels having less than four pixels may be filtered out and not included in any further processing. In such an example, any of the groups of pixels that have four corner points may not require additional corner filtering to identify only four candidate corners, but the quadrilateral formed by the four pixels may still undergo filtering to determine whether the quadrilateral is a candidate for the fiducial marker boundary, as described in more detail below. In addition, when the group of pixels is greater than four, filtering may be executed to determine the four pixels that may be the candidate corner points for the quadrilateral, as described in more detail below.

For each group of candidate corners, edges 310 (e.g., edges 310 for a first boundary 308A, edges 310B for a second boundary 308B, etc.) may be generated that extend from each candidate corner to a next closest candidate corner (e.g., a first candidate clockwise with respect to the centroid from the candidate corner, and a second candidate corner counterclockwise from the candidate corner), until a continuous string of edges 310 may be formed. In some examples, the candidate corners may be sorted with respect to their centroid (e.g., clockwise, counterclockwise, etc.), and edges 310 may be generated from each candidate corner to the next corner candidate based on the sorted list of candidate corners. For example, with respect to quad fitting 144 in FIG. 3, the candidate corners associated with the boundary 308A may be sorted clockwise from the centroid.

In such an example, the candidate corners may be sorted as the first pixel 302C, the second pixel 304B, the first pixel 302D, the first pixel 302E, the second pixel 304A, the first pixel 302F, the second pixel 304C, and then the first pixel 302C. As such, a first edge 310A may be generated that extends between the first pixel 302C and the second pixel 304B, a second edge 310A may be generated that extends between the second pixel 304B and the first pixel 302D, a third edge 310A may be generated that extends between the first pixel 302D and the first pixel 302E, and so on, until a continuous loop or grouping of edges is formed extending through each of the candidate corners.

In some examples, as a result of image aliasing or noise, one or more pixels may be detected as candidate corners that are not actually corners, but rather are misidentified pixels along an edge (e.g., an edge that forms part of a polygon). Therefore, to filter out these pixels improperly identified as corners, once the continuous loop or grouping of edges is formed, angles 312 formed between each two adjacent edges may be computed (e.g., calculated) in order to identify the actual corners of the polygons (e.g., quadrilaterals) from the candidate corners. In some examples, the candidate corners may be ordered with respect to their centroid, clockwise or counter-clockwise. For each of the candidate corners, the angle 312 may be calculated between a first vector (e.g., a first edge) from the candidate corner to an immediately preceding candidate corner and a second vector (e.g., a second edge) from the candidate corner to an immediately succeeding candidate corner. The candidate corners associated with edges (or vectors) that are the least collinear (e.g., with respect to its two neighbor corners) may be considered the actual corners. In other words, the angles 312 of least magnitude, or the angles closest to 90 degrees (e.g., for examples where the polygons are quadrilaterals), may be used to identify the actual corners (e.g., the first pixel 302C) and/or to filter out candidate corners that are on edges of the polygons (e.g., the second pixel 304A). As a result, the angles 312 of least magnitude, or the angles 312 closest to 90 degrees, may be identified as the actual corners for the polygons (e.g., the quadrilaterals with respect to the illustration of FIG. 3). As another example, such as where the polygon is an equilateral triangle, the angles 312 that are closest to 60 degrees may be determined to be the actual corners. Similar determinations may be made dependent on the shape that corresponds with the boundary of the fiducial marker that is to be identified.

For example, an angle 312A formed between an edge 310A that extends between the first pixel 302F and the second pixel 304C and an edge 310A that extends between the first pixel 302F and the second pixel 304A may include approximately a 90 degree angle. In such an example, the angle formed between the edge 310A that extends between the first pixel 302F and the second pixel 304A and an edge 310A that extends between the second pixel 304A and the first pixel 302E may be approximately 0 degrees. Similarly, the angles 312 formed by edges 310A extending from the first pixels 302C, 302D, and 302E may be approximately 90 degrees, while the angles formed by edges 310A extending from the second pixels 304B and 304C may be approximately 0 degrees. As such, the first pixels 302C, 302D, 302E, and 302F may be determined to be the actual corner points for the boundary 308A (e.g., which ultimately may be determined to be the fiducial marker boundary).

As another example, the corner candidates associated with the boundary 308B may undergo similar processing as described with respect to the boundary 308A. As a result, four corner points may be identified (e.g., the four corner points that the edges 310B extend between). The edges 310B are an example of an identified polygon (or quadrilateral with respect to FIG. 3) that ultimately may not be included as a candidate for a fiducial marker boundary (e.g., such as the boundary 308A). Similarly, boundaries 222B and 22D in FIG. 2C represent identified polygons as a result of quad fitting 144 that ultimately may not be included as candidates for a fiducial marker boundary, while the boundaries 222A and 222C may represent fiducial marker boundaries. As such, in order to identify fiducial marker boundaries, additional processing (e.g., filtering) may be employed.

One or more filters may be executed by the quad fitter 114 in order to filter out the identified polygons that it may not be desirable to use as candidates for fiducial marker boundaries. For example, a first filter may be applied that looks for lengths of edges 310, and/or compares lengths of edges 310 of the same boundary 308 to determine the proportions or ratio. For example, some fiducial markers may require a minimum number of pixels in order to effectively encode data. As a result, any edge 310 that has a length less than the minimum number of pixels may result in the polygon the edge 310 is associated with being filtered out. As another example, some fiducial markers may include known shapes, such as squares, rectangles, triangles (e.g., an equilateral triangle), etc., and as a result, proportions between different edges may be indicative of the candidacy for the polygon as a fiducial marker boundary. For a specific example, when the fiducial marker boundary is known to be a square, edges 310 of varying proportions (e.g., outside of a threshold taking into account image distortion or fiducial marker orientation in the environment) may be filtered out.

As another example, angles within the detected polygons may be used to filter out polygons as candidates for a fiducial marker boundary. For example, for fiducial markers of known shape, the angles formed by edges of the fiducial markers may be known. For example, for a square fiducial marker boundary, the internal angles should all be approximately 90 degrees, taking into account some variance based on orientation of the fiducial marker in the image, image distortion, etc. As such, with respect to FIG. 3, if the fiducial marker boundary is known to be square, then the angle 312B formed between the edges 310B of the polygon may be used to filter out the polygon as a candidate for a fiducial marker boundary (e.g., because the angle may be approximately 45 degrees, which may be outside of a threshold for an angle of a detected polygon in an image).

The result of quad fitting 144 is a set of one or more polygons that may be candidates for fiducial marker boundaries. The quad fitter 114 may transmit, send, and/or pass the candidate polygons to the decoder 116 for fiducial marker decoding 146. The decoder 116 may decode the candidate quads using the input image 202, the grayscale version of the input image 202, and/or the converted image 210, depending on the embodiment. As a result of using fiducial markers that may encode data in patterns of pixel values (e.g., pixel data), the decoder 116 may decode the pattern of pixels within the candidate fiducial marker boundaries (e.g., the pixels within the polygons identified by the quad fitter 114), and compare the decoded data (e.g., representing the pixel values) to existing or known pixel value masks or templates for fiducial markers (e.g., black and white pixel value codes, or fiducial marker data). For example, the decoded data representative of a code for the polygon may be compared against a code table (e.g., a query may be executed on the code table, which may be a lookup table) including listings of codes (e.g., fiducial marker data) representative of known fiducial markers. When the code associated with the polygon is included in the code table, a fiducial marker may be successfully recognized (e.g., the fiducial marker 204A, 204B, and 204C of FIG. 2C), while when the code is not included in the code table, the polygon may be considered a false positive and filtered out of further processing.

For example, with reference to AprilTags, AprilTags are generally of square shape and are generally N×N black or white cells where N is predefined depending on the AprilTag family or class. As a result, each AprilTag in a family or class may be encoded with an N×N bit binary code where 0 and 1 represent black and white, respectively. The decoder 116 may execute a decoding algorithm to determine the data represented by the polygon in the image (e.g., as represented by the pixels within the boundary 308A in FIG. 3). Once the pixel values are decoded from within the boundary 308A, the decoded pixel values (e.g., representing a code for a fiducial marker, such as an AprilTag) may be compared against a lookup table and/or code table including known pattern masks or templates for AprilTags. As a result, the pixels within the boundary 308A may be determined to be within a threshold similarity to one of the codes in the code table (e.g., within a threshold hamming distance, such as two, three, four, etc.). As a result, the boundary 308A may be determined be a successfully decoded fiducial marker (e.g., AprilTag) and may be used by the fiducial marker manager 118 to perform one or more functions, execute one or more commands, trigger one or more commands by another component or feature of the computing device 102 and/or another computing device 102 and/or 130.

With reference to FIG. 3, the portions of the image labeled "white" and "black" for corner detection 140 are also white and black in the other process blocks (e.g., boundary corner filtering 142, quad fitting 144, and fiducial marker decoding 146), but are not included in the other process blocks for clarity. The black and white areas in FIG. 3 may make up a fiducial marker, such as an AprilTag, an ARKit, an ARToolkit, and/or the like.

Figure 4:
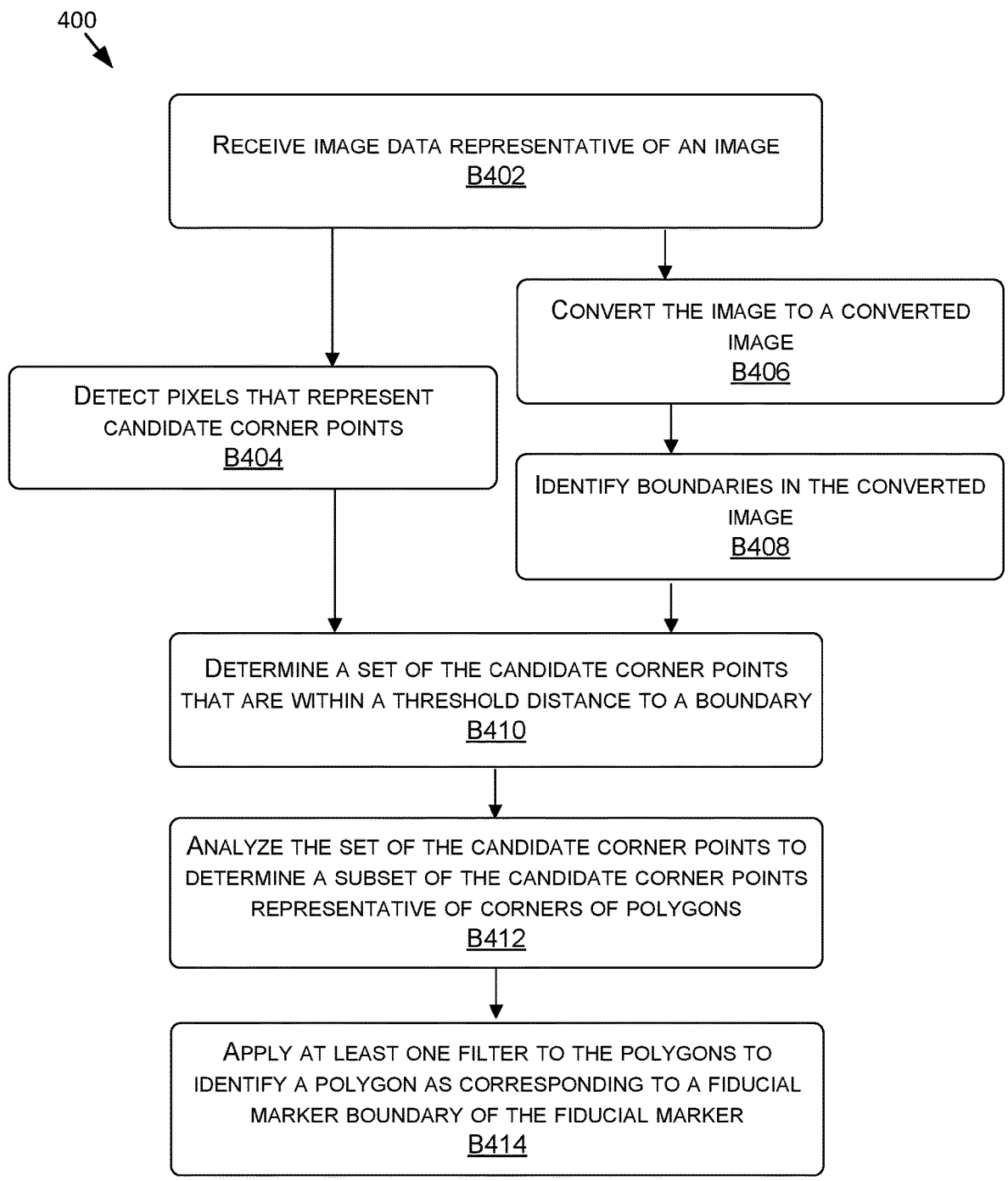
FIG. 4 is a flow diagram showing a method for fiducial marker identification, in accordance with some embodiments of the present disclosure.
Figure 5:
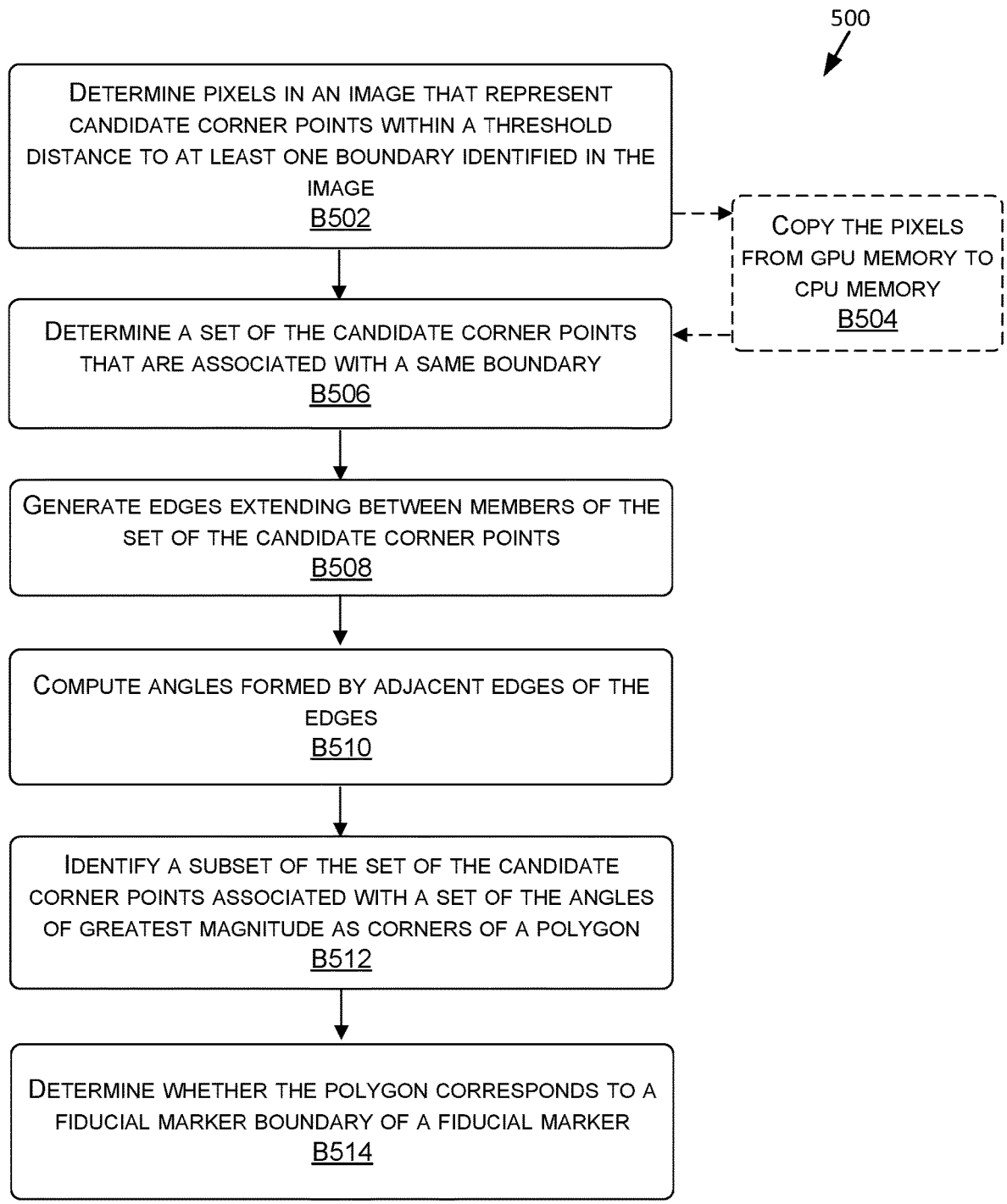
FIG. 5 is a flow diagram showing another method for fiducial marker identification, in accordance with some embodiments of the present disclosure.

Now referring to FIG. 4 and FIG. 5, each block of method 400 and method 500, described herein, comprises a computing process that may be performed using any combination of hardware, firmware, and/or software. For instance, various functions may be carried out by a processor executing instructions stored in memory. The method 400 and the method 500 may also be embodied as computer-usable instructions stored on computer storage media. The method 400 and the method 500 may be provided by a standalone application, a service or hosted service (standalone or in combination with another hosted service), or a plug-in to another product, to name a few. In addition, the method 400 and the method 500 are described, by way of example, with respect to the fiducial marker identification system 100 (FIG. 1A) and the process 132 (FIG. 1B). However, these methods may additionally or alternatively be executed by any one system, or any combination of systems, including, but not limited to, those described herein.

FIG. 4 is a flow diagram showing a method 400 for fiducial marker identification, in accordance with some embodiments of the present disclosure. The method 400, at block B402, includes receiving image data representative of an image. For example, the image manager 104 may receive image data representative of an image (e.g., at the input image receipt 134 process block of the process 132). The input image may have been captured by a camera(s) 120 of the computing device(s) 102. In some examples, the input image(s) may be stored in the data store(s) 126 and managed by the image manager 104.

The method 400, at block B404, includes detecting pixels that represent candidate corner points. For example, the corner detector 110 may detect pixels that represent candidate corner points (e.g., the corner 218 and the misidentified pixels 220 of FIG. 2B). In some examples, the detecting of the pixels that represent the candidate corner points may be executed by the corner detector 110 at the corner detection 140 process block of the process 132.

The method 400, at block B406, includes converting the image data to a converted image. For example, the image may be converted to from a higher dimensional color space to a converted image of a lower dimensional color space. This may include thresholding, such as adaptive thresholding 136, of the image. In some examples, a grayscale version of the image may be generated prior to adaptive thresholding 136 (and/or global thresholding). In some examples, the converting of the image to a converted image may be executed by the thresholder 106.

The method 400, at block B408, includes identifying boundaries in the converted image. For example, the boundaries separating adjacent white pixel regions (e.g., the region 212A of FIG. 2A) and black pixel regions (e.g., the region 212B of FIG. 2A) may be identified as a result of image segmentation 138 by the image segmenter 108.

The method 400, at block B410, includes determining a set of the candidate corner points that are within a threshold distance to a boundary. For example, the corner filter 112 may filter out the pixels from the set of the candidate corner points that are not within a threshold distance to one of the boundaries identified at block B408. In some examples, the corner filter 112 may determine the set of the candidate corner points when executing the boundary corner filtering 142 of the process 132.

The method 400, at block B412, includes analyzing the set of the candidate corner points to determine a subset of the candidate corner points representative of corners of polygons. For example, the quad fitter 114 may analyze the set of the candidate corner points to determine the subset of the candidate corner points that are the corners of the polygons. For example, the edges may be generated extending between adjacent candidate pixels, and the angles between adjacent edges may be analyzed to determine whether the candidate corner points may be suitable as corner points. The analyzing of the set of the candidate corner points may be executed by the quad fitter 114 when executing quad fitting 144 of the process 132.

The method 400, at block B414, includes applying at least one filter to the polygons to identify a polygon as corresponding to a fiducial marker boundary of the fiducial marker. For example, the polygons may be filtered based on edge length, edge length proportions, angles formed by edges, and/or based on comparing decoded data from within the polygons to a code table representative of known masks or template for fiducial markers. In some examples, the filters may be applied by the quad fitter 114 during quad fitting 144 and/or may be filtered out during fiducial marker decoding 146 by the decoder 116 when executing the process 132. As a result of the filters and/or the decoding, the remaining polygons may be determined to be fiducial markers, and the polygons may be determined to be fiducial marker boundaries.

FIG. 5 is a flow diagram showing another method 500 for fiducial marker identification, in accordance with some embodiments of the present disclosure. The method 500, at block B502, includes determining pixels in an image that represent candidate corner points within a threshold distance to at least one boundary identified in the image. For example, the pixels in the converted image 210 and/or the grayscale version of the input image 202 that are within a threshold distance to one of the boundaries identified in the converted image 210 and/or the grayscale version of the input image 202 may be determined. In some examples, the candidate corner points may be determined after input image receipt 134, adaptive thresholding 136, image segmentation 138, corner detection 140, and/or boundary corner filter 142 of the process 132. In some examples, as described herein, each of these steps may be executed on the GPU(s) 122, and one or more of the process blocks may be executed in parallel.

The process 500, at block B504, includes copying the pixels from GPU memory to CPU memory. For example, once boundary corner filtering 142 is completed by the GPU(s) 122, the process 132 may continue on the CPU(s) 124. As such, the pixels identified at block B502 may be copied from GPU memory to CPU memory for further processing by the CPU(s) 124. However, as illustrated by the dashed lines, block B504 is optional and, in examples where a GPU(s) 122 and a CPU(s) 124 are not both used, or where the next process blocks are not executed on the CPU(s) 124, block B504 may be removed.

The process 500, at block B506, includes determining a set of the candidate corner points that are associated with a same boundary. For example, the candidate corner points that are associated with a same boundary ID may be determined by the quad fitter 114 during quad fitting 144.

The process 500, at block B508, includes generating edges extending between members of the set of the candidate corner points. For example, the quad fitter 114 may generate edges that extend between each candidate corner point and each adjacent candidate corner point.

The process 500, at block B510, includes computing angles formed by adjacent edges of the edges. For example, the quad fitter 114 may compute the angles formed by adjacent edges of the edges.

The process 500, at block B512, includes identifying a subset of the set of the candidate corner points associated with a set of the angles of least magnitude as corners of a polygon. For example, the quad fitter 114 may identify a subset of the set of the candidate corner points that are associated with angles of least magnitude (e.g., the first pixels 302C, 302D, 302E, and 302F in FIG. 3).

The process 500, at block B514, includes determining whether the polygon corresponds to a fiducial marker boundary of a fiducial marker. For example, the quad fitter 114 and/or the decoder 116 may determine whether the polygon(s) detected in the image correspond to a fiducial marker boundary of a fiducial marker. This process may be similar to that of block B414 of the method 400 of FIG. 4, described above.

Figure 6:
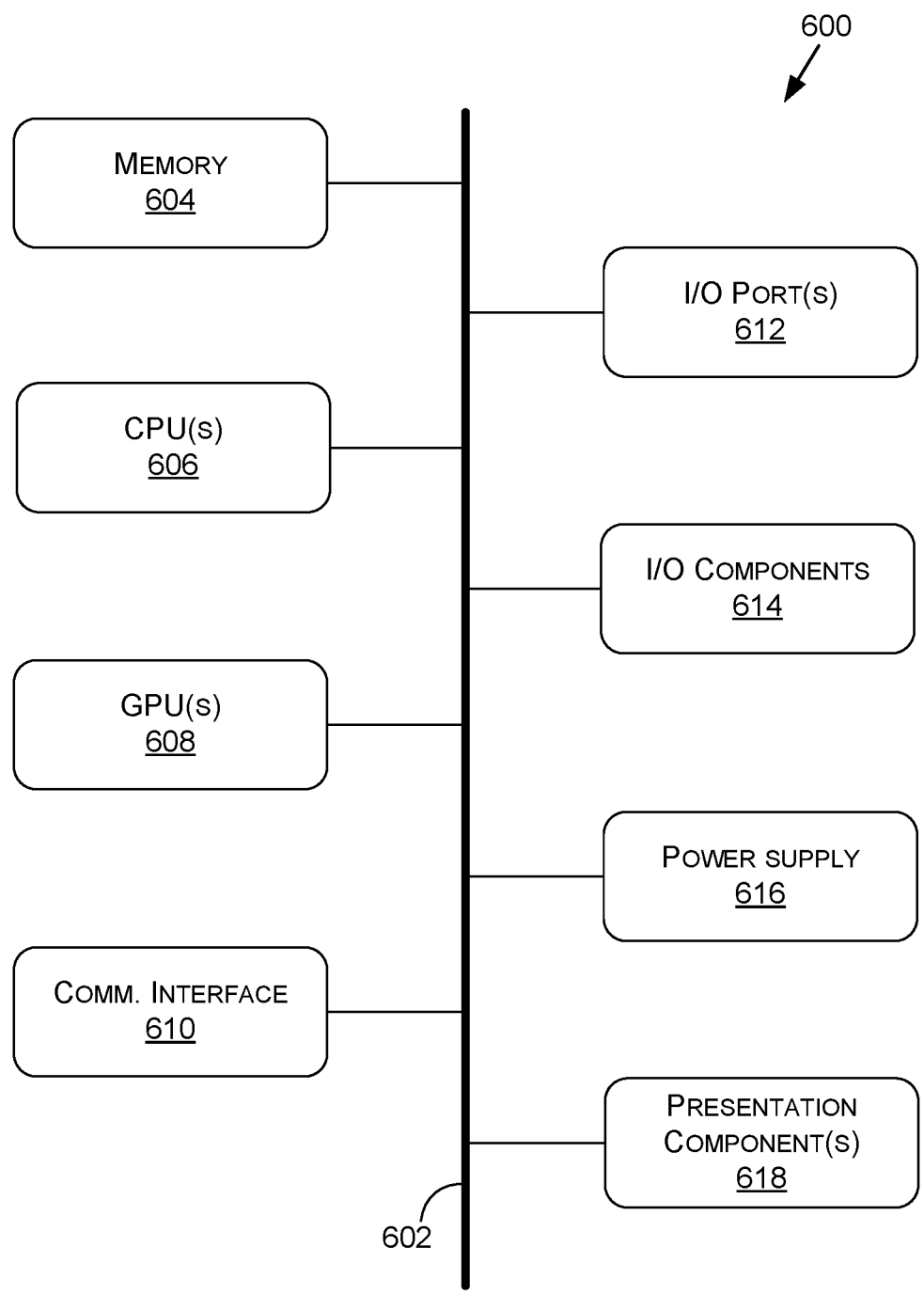
FIG. 6 is a block diagram of an example computing device suitable for use in implementing some embodiments of the present disclosure.

Now referring to FIG. 6, FIG. 6 is a block diagram of one example computing device 600 suitable for use in implementing at least some embodiments of the present disclosure. The computing device 600 may include a bus 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, and one or more presentation components 618 (e.g., display(s)).

Although the various blocks of FIG. 6 are shown as connected via the bus 602 with lines, this is not intended to be limiting and is for clarity only. For example, in some embodiments, a presentation component 618, such as a display device, may be considered an I/O component 614

(e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," "robots device," and/or other device or system types, as all are contemplated within the scope of the computing device of FIG. 6.

The bus 602 may represent one or more busses, such as an address bus, a data bus, a control bus, or a combination thereof. The bus 602 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 604 may include any of a variety of computer-readable media. The computer-readable media may be any available media that can be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 606 may be configured to execute the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an ARM processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

The GPU(s) 608 may be used by the computing device 600 to render graphics (e.g., 3D graphics). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data. The display memory may be included as part of the memory 604. The GPU(s) 608 may include two or more GPUs operating in parallel (e.g., via a link). When combined together, each GPU 608 can generate pixel data for different portions of an output image or for different output images (e.g., a first GPU for a first image and a second GPU for a second image). Each GPU can include its own memory, or can share memory with other GPUs.

In examples where the computing device 600 does not include the GPU(s) 608, the CPU(s) 606 may be used to render graphics.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

The elements (e.g., systems, components, features, machines, interfaces, functions, orders, groupings of functions, functionality, and/or arrangements) described with respect to embodiments of the present disclosure are set forth only as examples. Other elements other than those described herein may be used in addition to or instead of those described herein, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
   one or more circuits to:
   determine distances between candidate corner points in an image and one or more identified boundaries in the image;
   compare the distances to a threshold pixel distance to determine whether the candidate corner points are within the threshold pixel distance to at least one identified boundary of the one or more identified boundaries;
   determine, based at least on the comparison, a set of the candidate corner points that are within the threshold pixel distance to the at least one identified boundary of the one or more identified boundaries in the image;
   determine, from the set of the candidate corner points, a subset of the candidate corner points representative of corners of one or more polygons; and
   determine a polygon of the one or more polygons that corresponds to a fiducial marker.

2. The processor of claim 1, wherein the determination of the polygon of the one or more polygons comprises applying at least one filter to the one or more polygons.

3. The processor of claim 1, wherein the determining the distances comprises:
   determining first pixels corresponding to the candidate corner points; and
   determining second pixels corresponding to the one or more identified boundaries; and
   determining the distances between the first pixels and closest pixels from the second pixels.

4. The processor of claim 1, wherein one or more circuits are further to convert an initial image to the image in a lower dimensional color space.

5. The processor of claim 4, wherein the conversion of the initial image to the image comprises:
   converting the initial image to a grayscale image; and
   thresholding the grayscale image to generate a binary image,
   wherein the image is the binary image.

6. The processor of claim 1, wherein the one or more circuits are further to identify the one or more identified boundaries by, at least:
   identifying first consecutive clusters of a first color of pixels and second consecutive clusters of a second color of pixels in the image; and
   determining one or more points associated with the one or more identified boundaries based at least on identifying where at least one of the first consecutive clusters and at least one of the second consecutive clusters extend adjacent to one another.

7. The processor of claim 1, wherein the fiducial marker is one of an AprilTag, an ARTag, an ARToolkit fiducial marker, or an ARToolkitPlus fiducial marker.

8. The processor of claim 1, wherein the comparison is performed in parallel using a plurality of threads of a graphics processing unit (GPU).

9. The processor of claim 1, wherein the one or more circuits are further to:
  determine the one or more identified boundaries; and
  determine the candidate corner points,
  wherein the determination of the one or more identified boundaries and the determination of the candidate corner points is executed in parallel.

10. The processor of claim 1, wherein the determination of the subset of the candidate corner points representative of the corners of the one or more polygons comprises:
  determining members of the set of the candidate corner points that are associated with a same boundary ID;
  generating edges extending between the members of the set of the candidate corner points;
  computing angles formed by adjacent edges of the edges; and
  identifying the members of the set of the candidate corner points associated with a set of the angles of least magnitude as the subset of the candidate corner points.

11. A processor comprising:
  one or more circuits to:
    determine distances between candidate corner points in an image and one or more identified boundaries in the image;
    compare the distances to a threshold pixel distance;
    determine, based at least on the comparison, a set of the candidate corner points of the image that are within the threshold pixel distance to at least one identified boundary of the one or more identified boundaries in the image; and
    detect a fiducial marker using the image based, at least, on the set of the candidate corner points.

12. The processor of claim 11, wherein the set of the candidate corner points are representative of corners of one or more polygons, and the one or more circuits are further to determine a polygon of one or more polygons that corresponds to the fiducial marker.

13. The processor of claim 11, wherein the processor is comprised in at least one of:
  a control system for a machine;
  a system for performing deep learning operations;
  a system implemented using a robot;
  a system for performing conversational AI operations;
  a system incorporating one or more virtual machines (VMs);
  a system implemented at least partially in a data center; or
  a system implemented at least partially using cloud computing resources.

14. A method comprising:
  determining distances between candidate corner points in an image and one or more identified boundaries in the image;
  comparing the candidate corner points to a threshold pixel distance;
  determining, based at least the comparing, a set of the candidate corner points of the image that are within the threshold pixel distance to at least one identified boundary of the one or more identified boundaries in the image;
  determining, from the set of the candidate corner points, a subset of the candidate corner points representative of corners of one or more polygons; and
  determining a polygon of the one or more polygons that corresponds to a fiducial marker.

15. The method of claim 14, wherein the determining the polygon of the one or more polygons comprises applying at least one filter to the one or more polygons.

16. The method of claim 14, wherein the comparing comprises:
  determining whether the distances are less than or equal to the threshold pixel distance.

17. The method of claim 14, further comprising converting an initial image to the image in a lower dimensional color space.

18. The method of claim 14, further comprising:
  identifying first consecutive clusters of a first color of pixels and second consecutive clusters of a second color of pixels in the image; and
  determining one or more points associated with the one or more identified boundaries based at least on identifying where at least one of the first consecutive clusters and at least one of the second consecutive clusters extend adjacent to one another.

19. The method of claim 14, further comprising:
  determining points that are associated with the one or more identified boundaries; and
  determining the candidate corner points that are different than the points associated with the one or more identified boundaries.

20. The method of claim 14, wherein the determining the set of the candidate corner points include at least filtering out one or more of the candidate corner points that are outside of the threshold pixel distance.

* * * * *